June 17, 1969  E. E. BISSETT  3,450,271
RAILCAR COUPLING
Filed Feb. 13, 1967

Ernest E. BISSETT
INVENTOR
By Lyle G. Trorey,
Agent

United States Patent Office 3,450,271
Patented June 17, 1969

3,450,271
RAILCAR COUPLING
Ernest E. Bissett, 3616 Ontario St., Vancouver,
British Columbia, Canada
Filed Feb. 13, 1967, Ser. No. 615,494
Int. Cl. B61g 9/08, 3/00
U.S. Cl. 213—75       4 Claims

ABSTRACT OF THE DISCLOSURE

A railcar coupling having an electromagnet at an outer end of a piston rod of a double acting pneumatic cylinder, the electromagnet coupling a car to an armature of an adjoining car, the pneumatic cylinder serving to absorb shock of the coupling impact and also to draw the cars together to provide close coupling.

---

Figure 1:
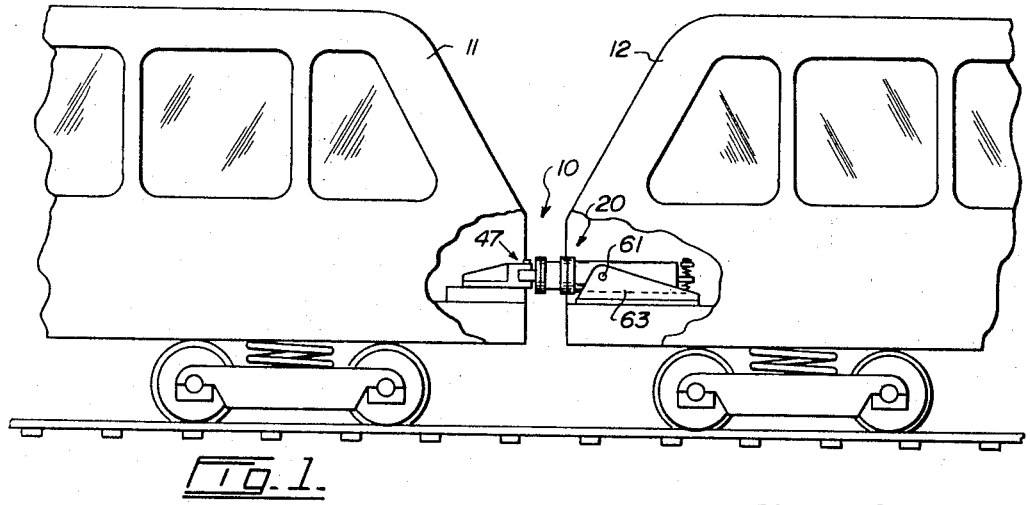

The invention relates to a coupling, adapted particularly but not exclusively to coupling cars of a railway or rapid transit system.

Mechanical couplings of this class are well known, many kinds existing and being in common use. Electromagnetic couplings are also known, and have an advantage in that uncoupling may be effected by deenergizing the electromagnet, and coupling may be effected by energizing the magnet when or before contact is made between an electromagnet of one car and an armature of an adjoining car. Many spring and pneumatic means are known and in use to reduce the effect of impact when coupling is effected. It is also known that close coupling is advantageous in certain circumstances, many known coupling devices are able to effect this.

In a coupling according to the present invention, coupling is effected by electromagnetic means of one car cooperating with an armature of an adjacent end of an adjoining car. In combination with the foregoing, I provide a double acting pneumatic cylinder means having the electromagnet attached to an end of a piston rod of the cylinder means. With suitable valve means, the cylinder provides cushioning upon impact and, as well, provides means of drawing the cars close to one another to effect close coupling. Air under pressure admitted to one side of a piston of the cylinder means to retract the piston rod accomplishes the foregoing close coupling.

The invention further provides vertical kingpin mounting of the armature, and spring means to restrain rotation of the armature about the kingpin.

Trunnion mounting of an assembly of the electromagnet and cylinder means is provided the trunnion having horizontal axes, and spring means to restrain rotation of the assembly about the trunnion axes. In this way, proper contact is maintained between the armature and poles of the electromagnets when the cars are traversing a curved path, and also when either minor irregularities, or major irregularities such as changes of grade, are encountered.

A pneumatic electromagnetic coupling according to the invention would, in certain cases, be supplemented by a known mechanical coupling. Such supplementation is however outside the present invention, and therefore is not further referred to herein.

Figure 2:
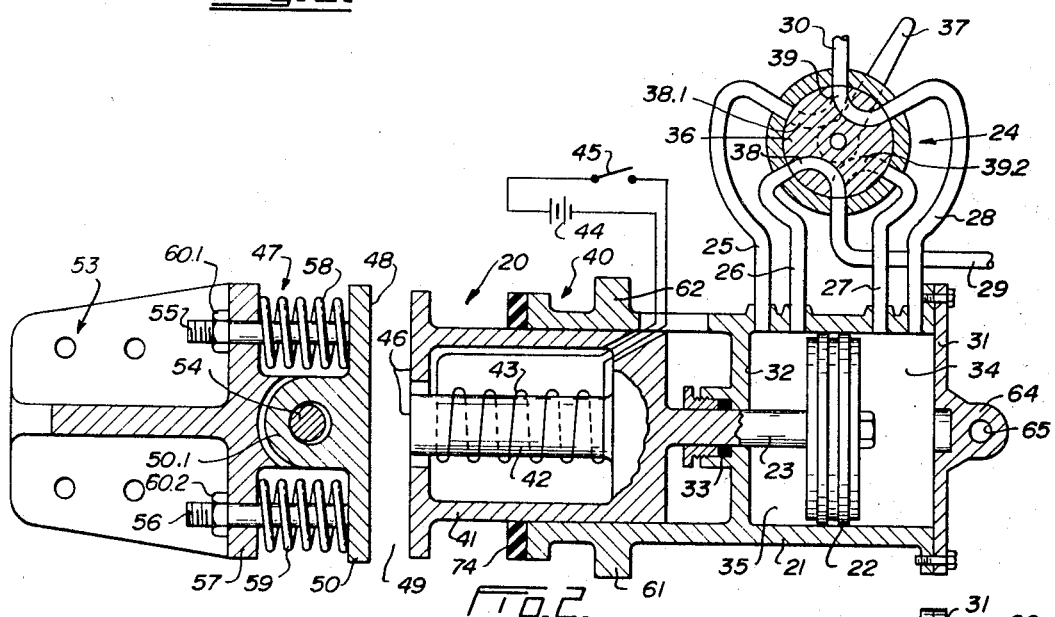
Figure 3:
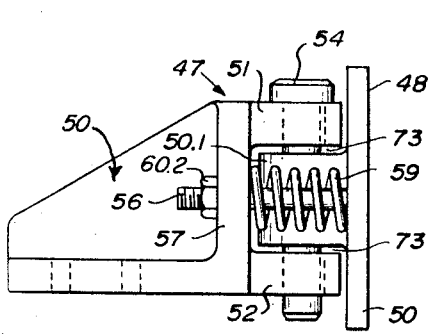
Figure 4:
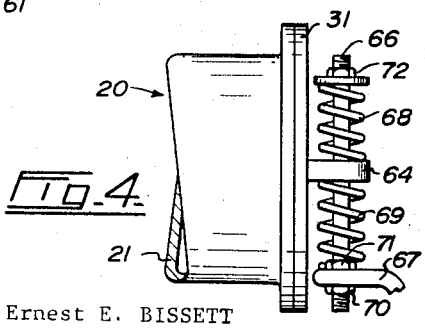

A particular embodiment of the invention is now described by way of example illustrated by drawings, the invention not being limited to the embodiment described and illustrated in the drawings, in which:

FIGURE 1 shows a coupling according to the invention coupling a leading car to a following car, FIGURE 2 shows in plan section a pneumatic and electromagnetic assembly, and an armature assembly cooperating with the electromagnet, FIGURE 3 is a detail of the armature assembly, FIGURE 4 is a detail elevation showing spring retaining means of the trunnion mounted electromagnetic pneumatic cylinder assembly.

In FIGURE 1 a coupling according to the invention is indicated generally by the numeral 10, and is shown coupling a leading car 11 to a following car 12.

In FIGURE 2, a pneumatic magnetic assembly is indicated generally by the numeral 20, which assembly is shown in FIGURE 1 secured to an end of the following car 12. The assembly has a double acting pneumatic cylinder 21 having a piston 22 and a piston rod 23. The numeral 24 indicates generally an air control valve having; a pressure line 25, an exhaust line 26, an exhaust line 27, a pressure line 28, a discharge line 29, and a pressure line 30 supplying air under pressure from a source, not shown, to the valve. The cylinder 21 has an outer end wall 31, and an inner end wall 32 through an obvious gland 33 of which the piston rod 23 passes.

The control valve 24 is a standard unit of a kind available from ordinary supply sources. The lines 27 and 28 extend from ports of the valve to communicate with a space 34 between the outer end wall 31 of the cylinder and the piston. Similarly, the lines 25 and 26 communicate with a space 35 between the inner wall 32 and the piston. The valve has an inner element 36 rotatable by means of a control lever 37, about a fixed central portion having U-shaped passages 38, 39, which, in a full line position as shown, admit air from the pressure line 30 to the space 34 so urging the piston 22 and the piston rod 23 to move to the left as viewed in FIGURE 2. Air in the space 35 will pass to the discharge line 26, thence to the exhaust line 29 via the passage 38.

When the control lever 37 is moved to place the U-shaped passages in a broken line position indicated by the numerals 38.1 and 39.2, the piston is similarly caused to move to the right, retracting the piston rod. The lever 37 may also be placed in a position, not shown, where each of the lines 25 through 28 is closed so that if, for instance, the piston 22 is in a mid-position as shown in FIGURE 2, there is pneumatic cushioning provided by air in the spaces 34 and 35, which cushioning is effective against motion tending to urge the piston rod either outwards or inwards. In FIGURE 2, the lines 25 and 26, and 27 and 28, are shown axially spaced for convenience of illustration. Normally the said lines would be circumferentially spaced.

An electromagnetic cylinder assembly is generally indicated by the numeral 40, which cylinder is coaxial, and suitably integral, with the pneumatic cylinder 21. The assembly 40 has a piston element 41 to which an outer end of the piston rod 23 is secured, so that the pistons 22 and 41 move with the piston rod. Central of the piston 41 is a core 42 having a winding 43 energized from an electrical source 44 when a switch 45 is closed. The piston 41 and the core 42 being of soft magnetic material, outer ends of the piston 41 and of the core 42, which outer ends are designated 46, become poles of an electromagnet.

The numeral 47 indicates an armature assembly which is, as seen in FIGURE 1, secured to an end of the leading car 11. Referring again to FIGURE 2, when the pole pieces 46 of the assembly 40 are energized as above described, a face 48 of an armature 50 will be strongly attracted to the pole faces, provided that an air gap 49 between them is sufficiently small. Referring now to FIGURE 3, the armature 50 has the face 48 aforesaid, and also a lug 50.1 extending between vertically spaced fork elements 51 and 52 of a bracket 53, the bracket being obviously secured to a part of the frame of the leading car. A kingpin 54 extends through the fork elements and lug aforesaid, so that the armature 50 is rotatable of the bracket 53 about the kingpin 54.

As best seen in FIGURE 2, spaced horizontally disposed bolts 55 and 56 have inner ends secured in the armature 50, and extend through holes of a vertical bracket member 57. The bolts 55 and 56 are each provided with a compression spring, designated respectively 58 and 59. To assemble the armature to the bracket, the springs are placed over the bolts which are then inserted through the bracket member 57, when nuts 60.1 and 60.2 are placed on the bolts and tightened until the lug 50.1 is drawn inwards to a position at which the kingpin 54 may be inserted. It is seen that the armature 50 is rotatable either clockwise or counterclockwise about the kingpin 54 and that, whichever the direction of rotation, that rotation is resisted by the springs 58 and 59. While a single spring configuration can obviously be used, I prefer to use two springs. It is to be noted that the kingpin 54 has an outside diameter materially less than that of the inside diameter of the lug hole through which it passes, according to known practice.

The pneumatic magnetic assembly 20 is provided with, as seen in FIGURE 2, short coaxial horizontally disposed trunnion shafts 61, 62 which, as shown in FIGURE 1 only, are journalled in a bracket 63, which bracket is obviously secured to a frame part of the following car 12. Thus the assembly 20 is rotatable about the horizontal trunnion shafts.

As seen in FIGURE 2 the cylinder outer end wall 31 has a central outwardly extending lug 64 having a hole 65. As seen in FIGURE 4 only, a vertical kingbolt 66 passes through the hole of the lug 64, the kingbolt being provided with lower and upper helical compression springs 68 and 69. The king-bolt is secured in an element 67 of the bracket 63 (FIGURE 1) by nuts 70 and 71. It is seen that, by means of an upper nut 72, the disposition of the assembly 20 may be adjusted.

Referring now to FIGURE 1, when both of the cars 11 and 12 are on level straight track, the assemblies 20 and 47 are aligned, and the pole faces 46 are parallel to the armature face 48 so that, when the cars are coupled, the pole faces and armature face are in contact.

A maximum draw-bar pull to accelerate a train, and to pull it up the steepest grades which will be encountered, is readily determinate. The required draw-bar pull may be several tons and, as is well known, the electrical power consumed in energizing the winding of an electromagnet to develop such pull is small.

The operation of the coupling is now described as follows.

The kingpin 54 provides such articulation as may be required to negotiate the sharpest curves of a line. It is to be noted that the spring means 58 and 59 provide both restraint and cushioning, making for a smooth ride when changes in curvature are encountered. When the leading car and the following car are upon different grades, as when passing over a change of grade, it is seen that the assembly 20 will rotate about the trunnions 61 and 62 to accommodate the change of grade, and that the springs 68 and 69, FIGURE 4, will act in a manner analogous to that described with reference to the springs 58 and 59, FIGURE 2, in accommodating to changes in curvature.

Having reference to FIGURE 3, it is seen that a clearance 73 is provided between adjacent edges of the forks 51 and 52 and the lug 50.1. This clearance is suitably of the order of a quarter of an inch, and is to compensate for local rail irregularities such as, for instance, at welds or joints of the rails.

A particular advantage of electromagnetic coupling is the ease with which uncoupling may be effected while the cars are in motion simply by opening the switch 45.

When it is desired to couple the car 11 to the car 12, whether both be moving or whether one is stationary, one car is caused to approach the other until the pole faces 46 contact the armature 48 the switch 45 being closed so that the electromagnet is energized. As the cars approach one another, the air control valve lever 37 is placed in a position to extend the position fully outwards so that the space 35 is reduced to its smallest extent. If the speed of approach of the two cars is small, the control lever may be placed in the closed position when cushioning of the impact will be effected by compression of air entrapped in the head space 34. If the speed of approach is higher, further compression may be obtained by partially opening the valve. It is clear then that a variety of cushioning effects are obtainable and under the control of an operator at the control lever. At an outer end of the electromagnetic cylinder 40, FIGURE 3, a stop 74 is provided, suitably of hard rubber. This is to take up any residual shock which may not have been absorbed, as before explained, by compression of air in the head space 34.

Coupling having been effected as above, the control lever 37 is moved to admit air to cause the piston rod 23 to be retracted, thus drawing the cars together so that they are close coupled.

Whether the cars are in motion or at rest, uncoupling is effected by opening the switch 45.

I claim:
1. In a coupling device, for coupling and uncoupling cars of a train, the combination of:
    (a) a double-acting pneumatic cylinder having a piston rod extending through an end wall of the cylinder, and valve means constructed and arranged to admit air under pressure, at will, to either face of the piston to cause the rod to be extended and retracted through the end wall aforesaid;
    (b) an electro-magnet secured to an end of the piston rod and means to energize and de-energize the electromagnet at will, the structure above being mounted at an end of a car adjacent an adjoining car; and
    (c) an armature mounted at an end of the adjoining car, the armature being adapted to cooperate with the electromagnet to couple and uncouple the adjoining cars.

2. Structure as defined in claim 1; wherein the armature is mounted to the car by means including a vertical kingpin, and at least one spring means adapted to restrain rotation of the armature about the kingpin.

3. Structure as defined in claim 2- wherein the cylinder is rotatably mounted upon horizontal trunnions secured to a fixed member of the car.

4. Structure as defined in claim 3; and spring means to restrain the motion of the cylinder about the trunnion aforesaid.

References Cited

UNITED STATES PATENTS

| | | | |
|---|---|---|---|
| 2,226,287 | 12/1940 | Miller. | |
| 2,500,180 | 3/1950 | Hubbell. | |
| 2,607,157 | 8/1952 | Smith. | |
| 3,176,801 | 4/1965 | Huff | 188—97 |
| 3,265,222 | 8/1966 | Goldman | 213—43 |
| 3,330,066 | 7/1967 | Crawford | 213—75 X |

DRAYTON E. HOFFMAN, Primary Examiner.

U.S. Cl. X.R.

213—43